L. Wilder,
BEST AVAILABLE COPY
Tuyere,
Patented
A. I. Aug. 23, 1838.
No. 12.
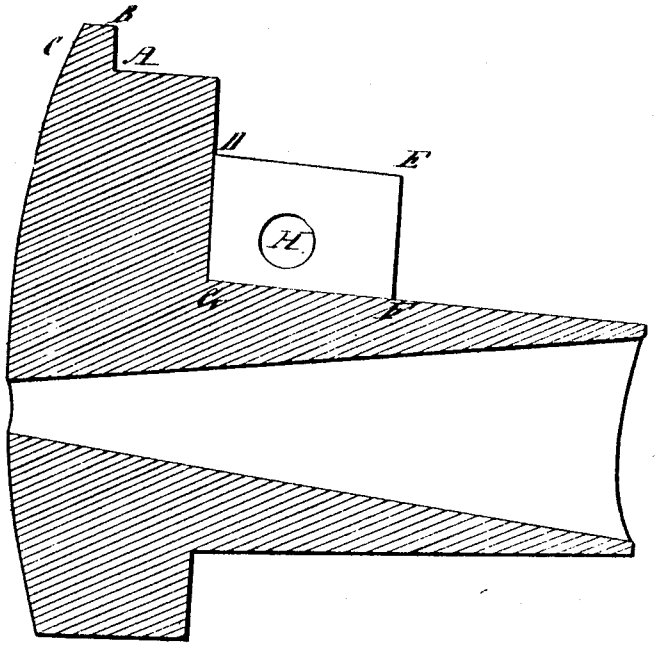
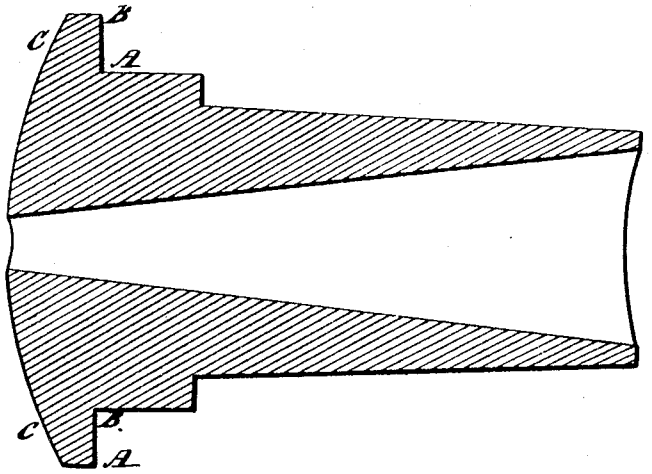
H. PETERS, PHOTO-LITHOGRAPHER, WASHINGTON, D. C.